US006853889B2

(12) United States Patent
Cole

(10) Patent No.: US 6,853,889 B2
(45) Date of Patent: Feb. 8, 2005

(54) VEHICLE DYNAMICS PRODUCTION SYSTEM AND METHOD

(75) Inventor: Colin Robert Cole, North Rockhampton (AU)

(73) Assignees: Central Queensland University, North Rockhampton (AU); Queensland Rail, Brisbane (AU)

(*) Notice: Subject to any disclaimer, the term of this patent is extended or adjusted under 35 U.S.C. 154(b) by 0 days.

(21) Appl. No.: 10/451,235

(22) PCT Filed: Dec. 20, 2001

(86) PCT No.: PCT/AU01/01645

§ 371 (c)(1),
(2), (4) Date: Oct. 28, 2003

(87) PCT Pub. No.: WO02/49900

PCT Pub. Date: Jun. 27, 2002

(65) Prior Publication Data

US 2004/0064235 A1 Apr. 1, 2004

(30) Foreign Application Priority Data

Dec. 20, 2000 (AU) .............................................. PR2219

(51) Int. Cl.[7] .............................................. B61B 13/00
(52) U.S. Cl. ...................... 701/19; 706/905; 246/122 R
(58) Field of Search .............................. 701/19, 20, 70, 701/93, 98, 201; 706/905; 246/122 R

(56) References Cited

U.S. PATENT DOCUMENTS

| 5,239,472 | A | | 8/1993 | Long et al. | |
|---|---|---|---|---|---|
| 5,332,180 | A | | 7/1994 | Peterson et al. | |
| 5,583,769 | A | | 12/1996 | Saitoh | |
| 5,740,547 | A | | 4/1998 | Kull | |
| 5,742,918 | A | | 4/1998 | Ashrafi et al. | |
| 5,862,048 | A | | 1/1999 | Knight | |
| 6,092,014 | A | * | 7/2000 | Okada | 701/70 |
| 6,098,007 | A | | 8/2000 | Fritz | |
| 6,151,548 | A | | 11/2000 | Kamihira et al. | |
| 6,459,964 | B1 | * | 10/2002 | Vu et al. | 701/19 |
| 6,760,712 | B1 | * | 7/2004 | Bonissone et al. | 706/4 |

FOREIGN PATENT DOCUMENTS

| AU | PCT/AU89/00421 | 5/1990 |
|---|---|---|
| JP | 58075410 | 5/1983 |

OTHER PUBLICATIONS

"Approximating Rail Locomotive Dynamics Using the SOCM Network" (Hannah et al.) IJCNN'99 vo. 3, 1999 pp 1934–1938 (Intl. Srch. Rep.).
MoNiF: A Modular Neuro–Fuzzy Controller for Race Car Navigation (Kim et al.) CIRA–97 IEEE International Symposium on Computational Intelligence in Robotics and Automation. (Intl. Srch. Rep.).
"Neurocontrol for Lateral Vehicle Guidance" (Neusser et al.) IEEE Micro Feb. 1993, ppp. 57–66. (Intl. Srch. Rep.).
On–board Train Management—LEADER proves its worth: by Hawthorn and Smith, *Conference on Railway Engineering*, Sep. 7–9, 1998, Enclosed.
"Long haul fuel conservation system" by Milroy & Jerine, *Railway Engineering Conference*. Adelaide Sep. 23–25, 1991, Enclosed.

* cited by examiner

*Primary Examiner*—Michael J. Zanelli
(74) *Attorney, Agent, or Firm*—Collard & Roe, P.C.

(57) ABSTRACT

A vehicle dynamics prediction system for providing prediction of vehicle velocity for a predetermined future time period. The predictions utilize future vehicle control setting anticipated for the time period. An artificial intelligence database coupled to a processor that utilizes weighted values for neural network models representing dynamic performance of the vehicle forms part of the vehicle dynamics prediction system.

13 Claims, 7 Drawing Sheets

US 6,853,889 B2

VEHICLE DYNAMICS PRODUCTION SYSTEM AND METHOD

CROSS REFERENCE TO RELATED APPLICATIONS

Applicants claim priority under 35 U.S.C. §119 of AUSTRALIA Application No. PR 2219 filed on 20 Dec. 2000. Applicants also claim priority under 35 U.S.C. §365 of PCT/AU01/01645 filed on 20 Dec. 2001. The international application under PCT article 21(2) was published in English.

FIELD OF THE INVENTION

This invention relates to vehicle driver support and vehicle control systems that estimates future vehicle dynamics based on current vehicle operational parameters and driver control settings. The invention relates particularly, although not exclusively, to a system and method for giving advance warning to a train driver, in real time, of predicted train dynamics based on hypothetical future control setting regimes. The invention is desirably embodied as a cabin instrument and finds particular application in long freight train consists.

BACKGROUND TO THE INVENTION

Since the wide availability of computer systems of considerable computational speed, it has been possible to simulate the dynamics of vehicles (such as trains) in real time using computer software implemented models. As microprocessor systems have increased in speed and power at reduced cost, real time simulations can be hosted by relatively inexpensive desktop personal computer systems. Prior art vehicle driver support systems may be conveniently considered in a number of categories, including simple on-board driver advice systems, on-board vehicle control systems and remote vehicle control systems.

In the railway environment, on board driver advice systems typically utilize track and signal conditions to suggest control regimes to the driver of a rail vehicle for minimizing energy usage or provide other information about the position or performance of the train. A generic example of a prior art driver advice system, showing the typical functional aspects and interaction with a human driver, is illustrated in FIG. 1. Japanese Patent Document No. 58-075410 by Tokyo Shibaura Denki KK, describes a driving command device for providing guidance as to the optimum vehicle control settings in order to conserve energy. International Patent Application No PCT/AU89/00421 by Teknis Systems (Australia) Pty Ltd (& U.S. Pat. No. 5,239,472), describes a driver advice system for energy conservation on rail vehicles which monitors elapsed time and distance travelled for calculating the optimal coasting based on a predetermined arrival time. Most energy advisory systems available to date are focussed on suburban type trains, rather than long freight trains.

U.S. Pat. No. 5,740,547 to Kull discloses a railway navigation system that merely provides information defining the position of a railway vehicle on a track system to a driver via a position display. The article "On-board Train Management—LEADER proves its worth" by Hawthorn and Smith, *Conference on Railway Engineering,* 7–9 Sep. 1998 describes a locomotive driver assist display and event recorder system for predicting the future state of a train based on present throttle and brake inputs by the driver. These systems all rely on a driver's ability to interpret the advice provided and, based on personal experience and/or intuitively, to select future control settings. This relationship with the driver is illustrated in FIG. 2 of the accompanying drawings.

The second category of driver support systems are on-board vehicle control systems, that are typically driven by energy conservation and/or time-tabling concerns. One example is disclosed in U.S. Pat. No. 5,583,769 to Saitoh, assigned to Toshiba KK. This patent describes an automatic train operation apparatus that employs neural networks for controlling power and braking inputs in response to train speed information, a desired speed profile and signals from reference terminals for use in stopping the train at a desired position. U.S. Pat. No. 5,862,048 to Knight, assigned to New York Air Brake Corporation, describes a digitally controlled electro-pneumatic braking system that includes a train monitoring system for monitoring operating conditions of each vehicle by way of a specific type of computer network installed on the train.

The third type of driver support system are those which are located in a central office and communicate with one or more trains in a rail network. The article "Long haul fuel conservation system" by Milroy & Jerinc, *Railway Engineering Conference,* Adelaide 23–25 Sep. 1991, describes a central office dynamic rescheduling system for minimizing costs whilst satisfying operational requirements, including an on-board advice unit for generating tactical advice to the drivers of long haul trains based on certain journey (including track gradient) and train operating parameters. U.S. Pat. No. 5,332,180 to Peterson et al, assigned to Union Switch & Signal, describes a railway traffic control system wherein an inertial measurement apparatus is carried on a train for deriving a position estimate of the train for communication to central train control facility. The central control facility can include a dynamic track analyzer with a neural network which analyses position information from trains in order to calculate train rolling resistance. This information can be coordinated with acceleration data and a calculated braking strategy for the train in order to optimise fuel usage.

Some of the prior art systems, such as the Knight patent, provide information to the driver about train dynamics that have just occurred. This information, at least in the Knight patent, is obtained from step-wise numerical simulation using deterministic differential equations to provide certain train operational parameters without direct measurement. While such information may be useful, it does not provide any warning information to the driver that could be used to improve train stability in the immediate future, as may be achieved by effecting desirable control setting changes.

If undesirable or potentially dangerous train dynamics are to be minimized by driver intervention, then a system that gives advance warning of future train dynamics is required. The use of step-wise numerical integration to simulate future time is computationally prohibitive. To advance such a simulation just one step, using a typical step size of 10 ms, doubles the simulation computations because the existing real time simulation must be maintained. For a simulated advance warning system with a future prediction period of 60 seconds, the computational multiple is 6000. While such computational power may be available in mainframe installations or parallel processing facilities, they are not feasible for a vehicle on-board instrument of realistic cost.

OBJECT OF THE INVENTION

It is an object of the present invention to provide a vehicle dynamics prediction system and method which ameliorates or overcomes at least some of the problems associated with the prior art.

It is another object of the invention to provide a vehicle dynamics prediction system and method whereby predictions of future vehicle dynamics, based on hypothetical future control setting regimes, are provided to the driver in real time.

Further objects will be evident from the following description.

DISCLOSURE OF THE INVENTION

In one form, although it need not be the only or indeed the broadest form, the invention resides in a vehicle dynamics prediction system for providing predictions, over a predetermined future time period, of vehicle velocity, which predictions utilize future vehicle control settings anticipated for that period, said prediction system including:

(a) a processing means coupled to a user interface for facilitating selection of future control settings and selection of a route for travel of the vehicle;

(b) a first input arrangement for inputting data about current vehicle position to the processing means;

(c) a second input arrangement for inputting data about current vehicle control settings and data about current vehicle operational parameters to the processing means;

(d) a first memory arrangement coupled to the first input arrangement for storing historical vehicle position data and for buffering current vehicle position data prior to storage;

(e) a second memory arrangement coupled to the second input arrangement for storing historical control setting data and historical operational parameter data and for buffering current control setting data and current operational parameter data prior to storage;

(f) an artificial intelligence database coupled to the processing means, containing a plurality of weighting values for neural network models representing dynamic performance of respective units comprising the vehicle;

(g) a route topographical database coupled to the processing means, containing position data about available routes of travel for the vehicle;

wherein the processing means calculates future conditions of the vehicle based on the current vehicle position data relative to the selected route utilizing position data obtained from the route topographical database, and predicts the vehicle velocity in the vehicle during said predetermined period by processing the vehicle control setting data and operational parameter data through the neural network models, which models employ the weighting values from the artificial intelligence database, for calculated future vehicle positions and associated future control settings.

Desirably the vehicle dynamics prediction system also provides predictions of longitudinal forces present in the vehicle, wherein the processing means uses the vehicle velocity predictions combined with future control data to further predict longitudinal forces for at least one selected location in the length of the vehicle during said predetermined period.

Suitably the vehicle control settings include throttle and brake settings; whilst the vehicle operational parameters include the velocity of the vehicle and the force between at least two inter-coupled units of the vehicle.

If required, the force between a motive power unit and a plurality of trailed units is predicted by the system.

In one aspect, the vehicle dynamics prediction system of the invention may be adapted to vehicles in the form a train consisting of at least locomotive unit and a plurality of wagon units and/or carriage units.

In an alternative aspect, the vehicle dynamics prediction system of the invention may be adapted to vehicles in the form a multiple trailer road vehicle comprising a prime mover or tractor and at least three trailer units.

In another form, the invention resides in a method of predicting, over a predetermined future time period, vehicle velocity which predictions utilize future vehicle control settings anticipated for that period, said prediction method including the steps of:

(a) selecting future control settings and a desired route for travel of the vehicle;

(b) inputting data about current vehicle position to a processing means;

(c) inputting data about current vehicle control settings and data about current vehicle operational parameters to the processing means;

(d) storing in a first memory arrangement coupled to the first input arrangement, historical vehicle position data and buffering current vehicle position data prior to storage;

(e) storing in a second memory arrangement coupled to the second input arrangement, historical control setting data and historical operational parameter data and buffering current control setting data and current operational parameter data prior to storage;

(f) providing an artificial intelligence database coupled to the processing means, containing a plurality of weighting values for neural network models representing dynamic performance of respective units comprising the vehicle;

(g) providing a route topographical database coupled to the processing means, containing position data about available routes of travel for the vehicle;

(h) calculating future conditions of the vehicle based on the current vehicle position data relative to the desired route and position data obtained from the route topographical database;

(i) processing the vehicle control setting data and operational parameter data through at least one neural network model, which models employ the weighting values from the artificial intelligence database, for calculated future positions and associated future control settings to provide predictions of the vehicle velocity during said predetermined period.

Desirably the method also provides predictions of longitudinal forces present in the vehicle, wherein the processing means uses the vehicle velocity predictions combined with future control data to further predict longitudinal forces for at least one selected location in the length of the vehicle during said predetermined period.

If required the prediction of longitudinal forces present in the vehicle includes prediction of the forces between a motive power unit, such as a locomotive or group of locomotives, and trailed units, such as freight wagons, in order to predict both force input into the trailed units by the motive power unit (ie. traction force) and force input into the motive power unit by the trailed units (ie. dynamic braking force).

Suitably a prediction of energy transfer occurring in the vehicle during the predetermined period may be predicted from the following formula, using predictions of forces between the motive power unit and trailed units and predictions of vehicle velocity:

$$Energy = \sum_{i=0}^{i=n} F_i \cdot v_i \delta t$$

where: F=instantaneous force prediction;
v=instantaneous vehicle velocity prediction;
i=time sample instance; and
n=number of samples in said predetermined period.

In one arrangement, the predictions of longitudinal forces are provided by a separate neural network model; whilst in an alternative arrangement, the predictions are provided by a single integrated neural network model.

BRIEF DETAILS OF THE DRAWINGS

To assist in understanding the invention preferred embodiments will now be described with reference to the following figures in which.

DETAILED DESCRIPTION OF THE DRAWINGS

The applicants have realised, in light of the ready availability of low cost computational power, that a simulation of vehicle dynamics using vehicle operational parameters and making the simulation output available to the vehicle's driver in synchronism with real vehicle operation, could be a useful monitoring tool for the driver. The preferred embodiments of the invention described herein relate to a train consist, although it will be appreciated that the invention will find application in a variety of other vehicles.

Figure 1:
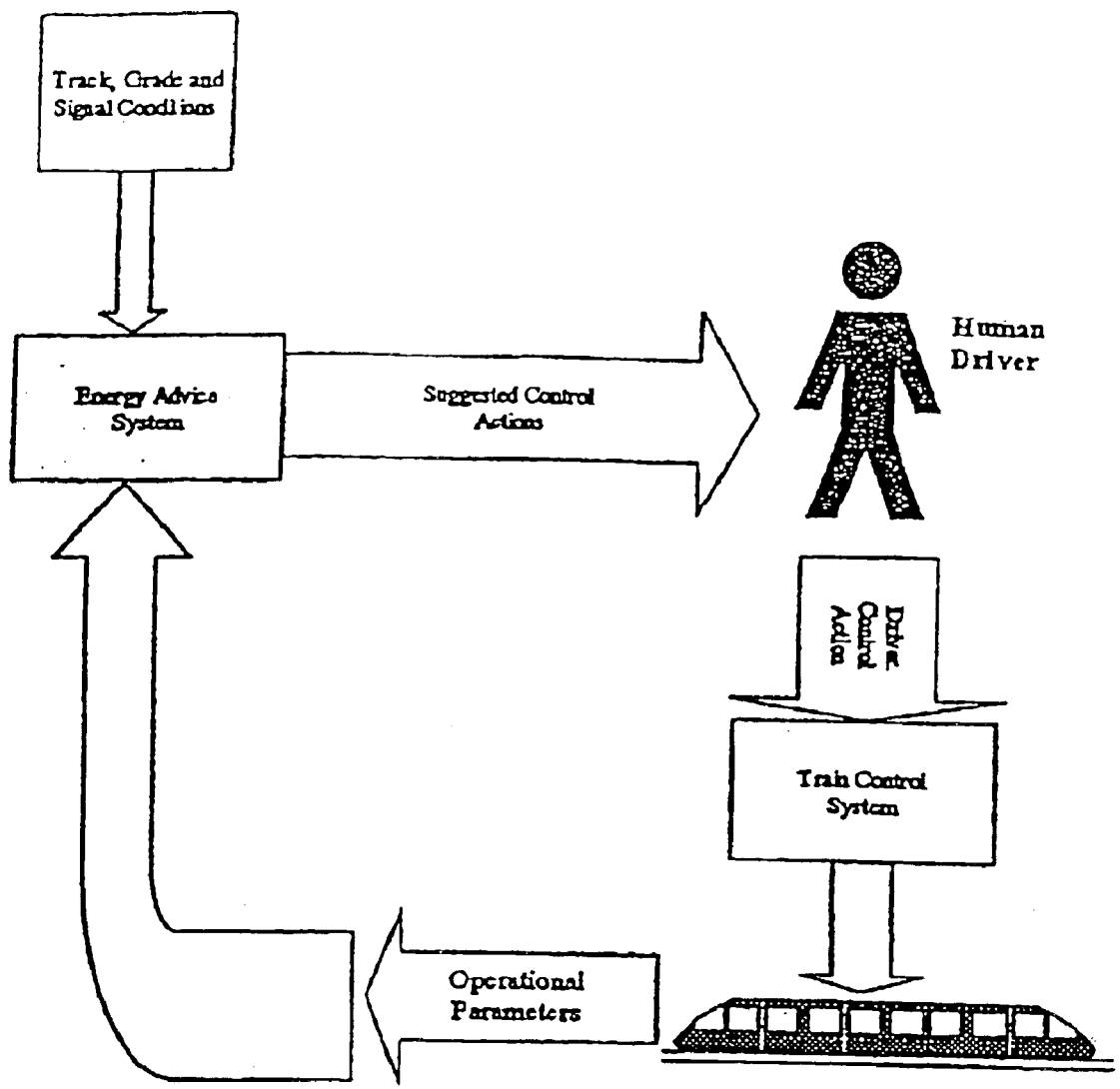
FIG. 1 illustrates the typical functions of a prior art driver advice system for rail vehicles.
Figure 2:
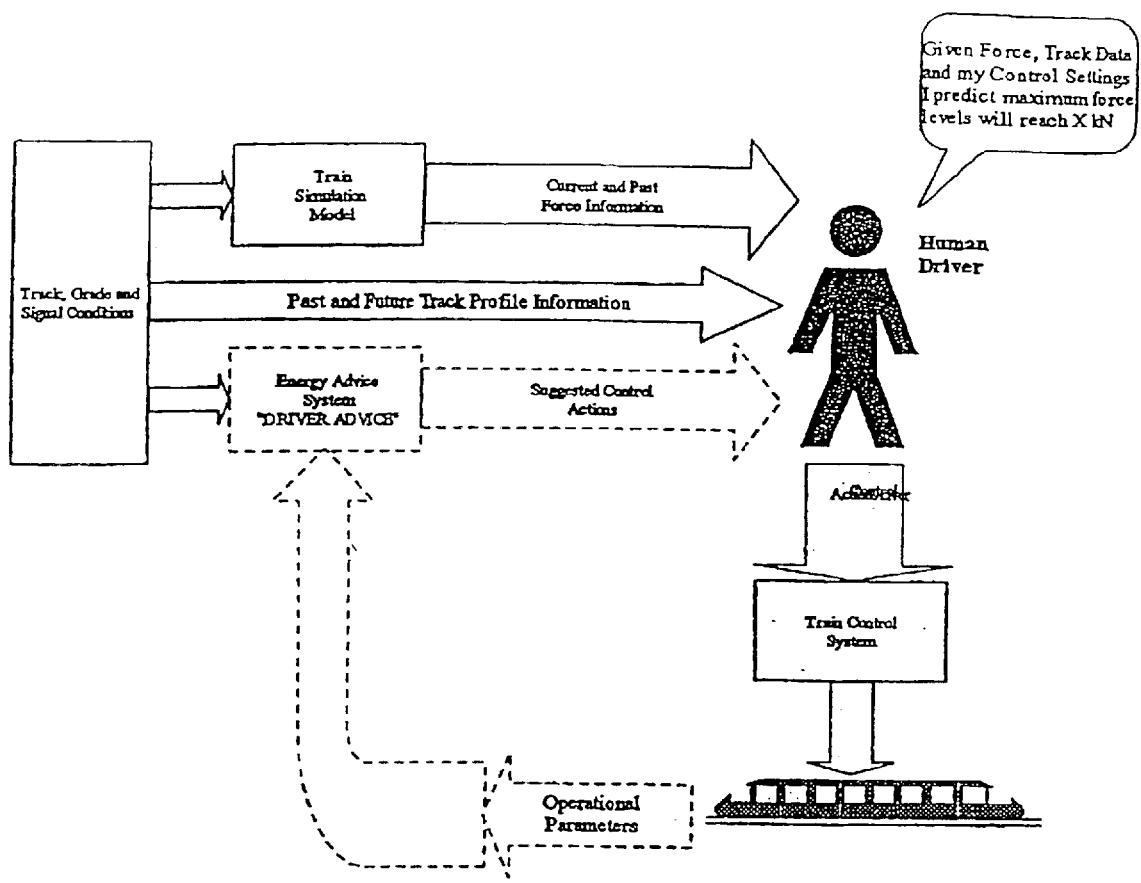
FIG. 2 illustrates the relationship between a driver and a further prior art driver advice system.
Figure 3:
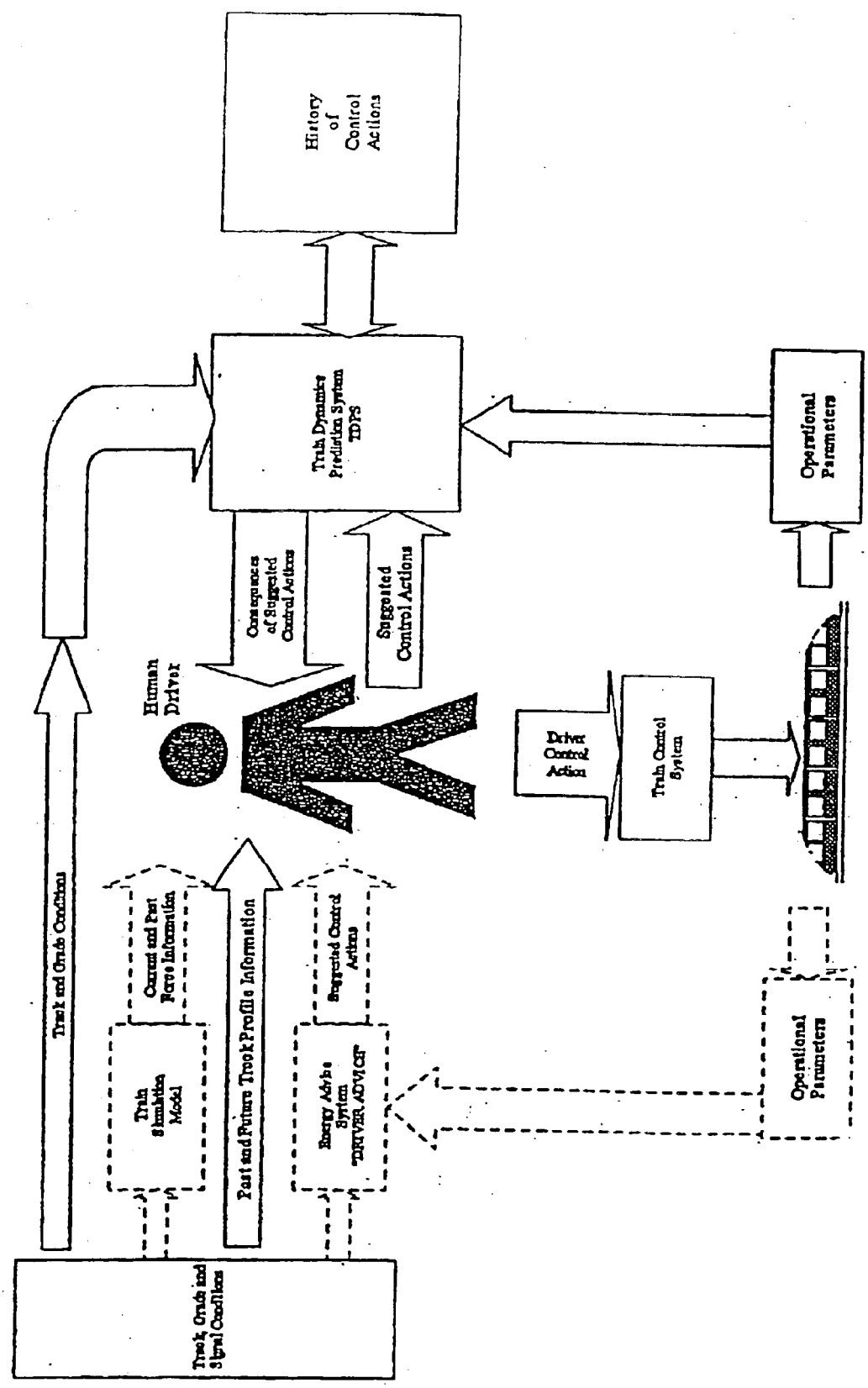
FIG. 3 illustrates the relationship between a driver and the train dynamics prediction system of the invention.

In contrast to the prior art, and as illustrated in FIG. 3, the present invention uses both historical and present vehicle control settings, together with future vehicle control settings and a desired route for travel of the vehicle, to predict future vehicle dynamics, such as velocity and coupler force. The invention is characterized by the use of neural network models to represent the dynamic performance of individual units, such as locomotives and wagons, comprising of the vehicle. The simulation can optionally also provide virtual current (as distinct from future) output for any simulated parameter in the train, without the need to directly measure that parameter.

Figure 4:
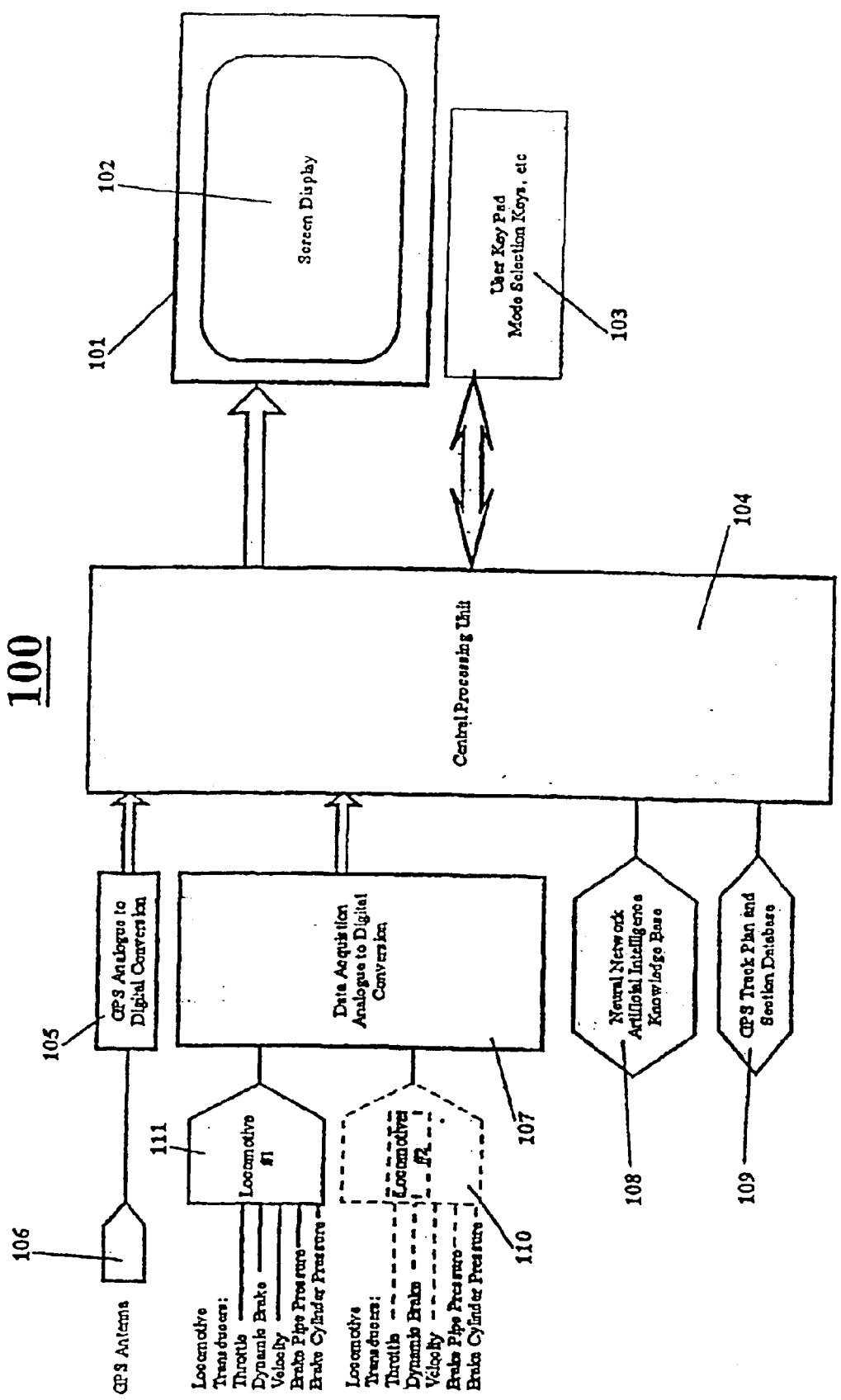
FIG. 4 is a block diagram of a first embodiment of the train dynamics prediction system the invention.

Referring to FIG. 4, the Train Dynamics Prediction System (TDPS) 100 of the embodiment includes a locomotive cabin instrument 101 designed to assist drivers in understanding train force dynamics and to provide information regarding the forces and velocities expected in a future time period of predetermined duration. The cabin instrument 101 includes a display screen 102 and a keypad 103 allowing the driver to interact with the TDPS. The instrument 101 thus provides a user interface consisting of a colour display with either a manual keypad selection or more conventional keyboard for some embodiments. The keypad 103 will allow selection of displays and future control setting data. A conventional keyboard will allow addition of new control scenarios, system maintenance and software upgrades.

The predictions of force and velocity are continually updated and the instrument display is arranged to keep pace with real time. The TDPS may be conveniently based on an industrial type computer motherboard with suitably specified central processing unit 104, such as an Intel™ processor from the x86 family running at 550 MHz, which receives data from two data acquisition modules. A first input arrangement, which takes the form of an analogue to digital conversion (ADC) module 105 receives signals from a global positioning system (GPS) antenna 106 mounted on the vehicle, and a second input arrangement, which also takes the form of ADC module 107, receives operational parameter signals and control settings from a variety of transducers mounted on the vehicle.

The vehicle control settings include throttle position, dynamic brake, locomotive brake cylinder pressure and wagon brake pipe pressure, whilst the vehicle operational parameters include vehicle velocity, for each of two locomotives 110 and 111. The operational parameter data and control setting data acquired in this way provides both present "real time" data, which is later stored in a memory arrangement (not shown) to provide historical operational parameter data and historical control setting data. The processor 104 is also coupled to a GPS track plan and section database 109 that includes topographical information for potential routes of travel of the train.

The TDPS of the embodiment utilizes a set of artificial neural networks (ANN), each of which is developed to predict vehicle velocity and also coupler force at a selected position in the train, over a future time period. Inputs to the neural network include hypothetical future control setting regimes, measured locomotive operational parameters and control settings, and vehicle position information. The position information is utilized in conjunction with the track plan database to determine track gradients from the stored topographical information. Examples of typical ANN structures are set out in tables 1 and 2 below, which relate to a distributed power (ie. locomotive) train and a head end power train. The use of output feedback and first differences depends on the characteristic of the output data. Coupler force data has different characteristics at different longitudinal locations in the train, resulting in slightly different data input structures. The number of input nodes for each ANN parameter class should be selected as follows:

NF Undecimated number of future data input or output nodes (time based). Application defined, depending on how much future information is required.

NFG Number of future grade data input nodes (time and distance based). Application defined, depending on how much future information is required.

NPH Number of past history data input nodes (time based). Defined by the duration of the longest sustained transient.

NPG Number of past grade data input nodes (distance based). Defined by the length of the train and distance index, inputs must envelope train length.

TABLE 1

Detailed ANN Input Structure - Distributed Power Train

| Item | Inputs Parameters | Parameter Type | No. Inputs |
|---|---|---|---|
| 0 | Front Throttle Level | Control Future | NF |
| 1 | Remote Throttle Level | Control Future | NF |
| 2 | Front Brake Pipe Pressure | Control Future | NF/10 |
| 3 | Remote Brake Pipe Pressure | Control Future | NF/10 |
| 4 | Front Locomotive Brake Cylinder Pressure | Control Future | NF/10 |
| 5 | Remote Locomotive Brake Cylinder Pressure | Control Future | NF/10 |
| 6 | Grades | Track Topography Future | NFG = NF/10 |
| 7 | Front Throttle Level | Control State and History | NPH |
| 8 | Remote Throttle Level | Control State and History | NPH |
| 9 | Front Velocity | Control State and History | NPH/10 |
| 10 | Remote Velocity | Control State and History | NPH/10 |
| 11 | Front Brake Pipe Pressure | Control State and History | NPH/10 |
| 12 | Remote Brake Pipe Pressure | Control State and History | NPH/10 |
| 13 | Front Locomotive Brake Cylinder Pressure | Control State and History | NPH/10 |
| 14 | Remote Locomotive Brake Cylinder Pressure | Control State and History | NPH/10 |
| 15 | Grades | Track Topography State and History | NPG |
| 16 | BIAS | | 1 |
| 17 | Coupler Force | Control Future Feedback | NF |
| 18 | Velocity | Control Future Feedback | NF/10 |
| 19 | Front Throttle Level First Differences | Control State and History Differentials | NPH-1 |
| 20 | Remote Throttle Level First Differences | Control State and History Differentials | NPH-1 |
| 21 | Front Brake Pipe Pressure Differences | Control State and History Differentials | NPH/10-1 |
| 22 | Remote Brake Pipe Pressure Differences | Control State and History Differentials | NPH/10-1 |
| 23 | Front Locomotive Brake Cylinder Pressure Differences | Control State and History Differentials | NPH/10-1 |
| 24 | Remote Locomotive Brake Cylinder Pressure Differences | Control State and History Differentials | NPH/10-1 |

TABLE 2

Detailed ANN Input Structure - Head End Power Train

| Item | Inputs Parameters | Parameter Type | No. Inputs |
|---|---|---|---|
| 0 | Front Throttle Level | Control Future | NF |
| 1 | Front Brake Pipe Pressure | Control Future | NF/10 |
| 2 | Front Locomotive Brake Cylinder Pressure | Control Future | NF/10 |
| 3 | Grades | Track Topography Future | NF/10 |
| 4 | Front Throttle Level | Control State and History | NPH |
| 5 | Front Velocity | Control State and History | NPH/10 |
| 6 | Front Brake Pipe Pressure | Control State and History | NPH/10 |
| 7 | Front Locomotive Brake Cylinder Pressure | Control State and History | NPH/10 |
| 8 | Grades | Track Topography State and History | NGP |
| 9 | BIAS | | 1 |
| 10 | Coupler Force | Control Future Feedback | NF |
| 11 | Velocity | Control Future Feedback | NF/10 |
| 12 | Front Throttle Level First Differences | Control State and History Differentials | NPH-1 |
| 13 | Front Brake Pipe Pressure Differences | Control State and History Differentials | NPH/10-1 |
| 14 | Front Locomotive Brake Cylinder Pressure Differences | Control State and History Differentials | NPH/10-1 |

The neural network structures depend on the train configuration being modelled, a new network being required for each train type and train position to be modelled. The neural network is trained, in a fashion known to those skilled in this field of computing, using a combination of measured and simulated data. The data used for training must include all the control setting information and train operational parameters including the train velocity and selected coupler force output information. The data must be comprehensive, covering many possible control scenarios, thus requiring some simulated data in the training strategy.

The neural network of the embodiment is structured with a single hidden layer, which hidden layer utilizes hyperbolic tangent neuron functions and the output layer has linear neuron functions. The applicants have trained networks using a combination of the following known techniques together with back propagation:

(i) modified delta-bar-delta learning rate adjustment;
(ii) momentum;
(iii) batch and cyclical weight adjustment; and
(iv) neuron function slope adjustment.

Further details of training such networks may be obtained from standard texts, including for example Zuranda, J. M., *Introduction to Artificial Neural Systems*, West Pub. Co., St. Paul Minn., 1992 and Fausett, L., *Fundamentals of Neural Networks*, Prentice Hall, Englewood Cliffs, N.J., 1994.

Figure 5:
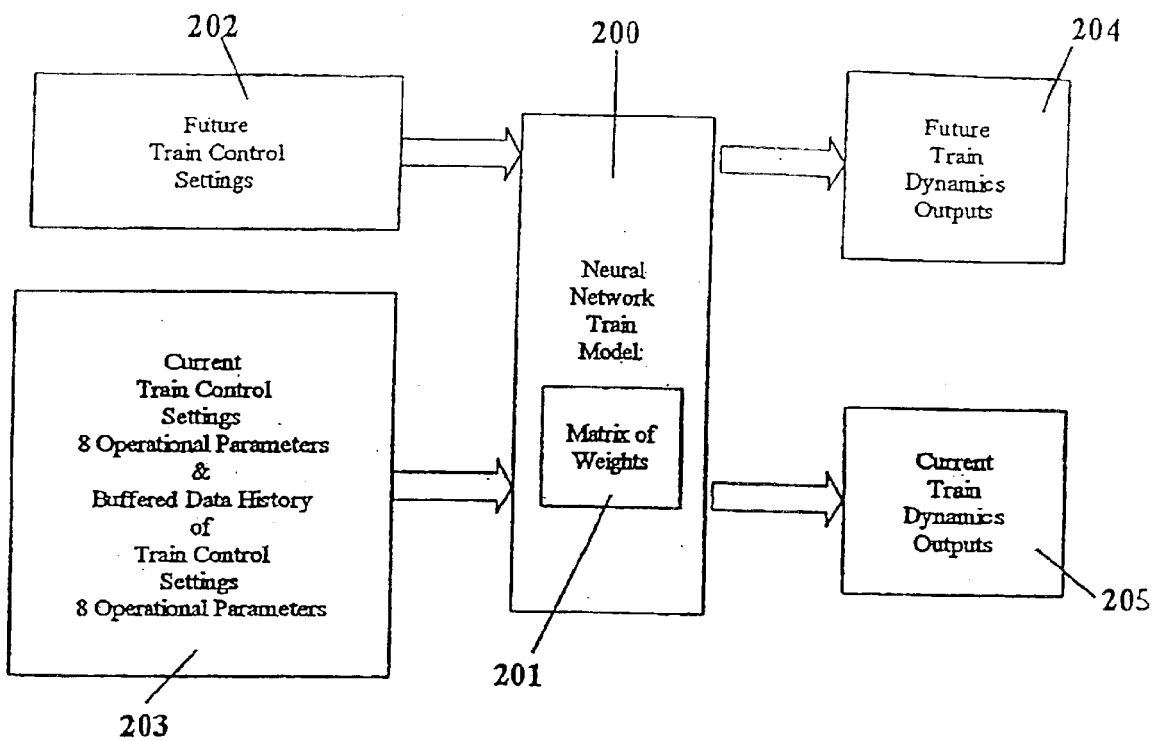
FIG. 5 shows a conceptual diagram of an artificial neural network (ANN) model, as employed in the first embodiment of the train dynamics prediction system.

When satisfactorily trained, neuron weights are frozen and implemented in user software consisting of a C code executable and user interface objects from National Instruments Measurement Studio to give predictions of future train velocity and coupler forces. The trained networks are stored as matrices of weights in an artificial intelligence database 108, which is coupled to the processor allowing the weights to be loaded for use with the ANN prediction software as required. It is envisaged that a library of trained networks will be developed for each train type, as required. A conceptual diagram of an ANN model 200 employed in the first embodiment is shown in FIG. 5. The ANN model employs a matrix of weights 201, and receives input data in the form of future train control settings 202 together with current train control settings and operational parameters, together with buffered history of train control settings and operational parameters 203. The ANN model provides future train dynamics outputs, including train velocity and coupler force predictions 204. If required, predictions of current train dynamics outputs 205 can also be provided by the model 200.

Figure 6:
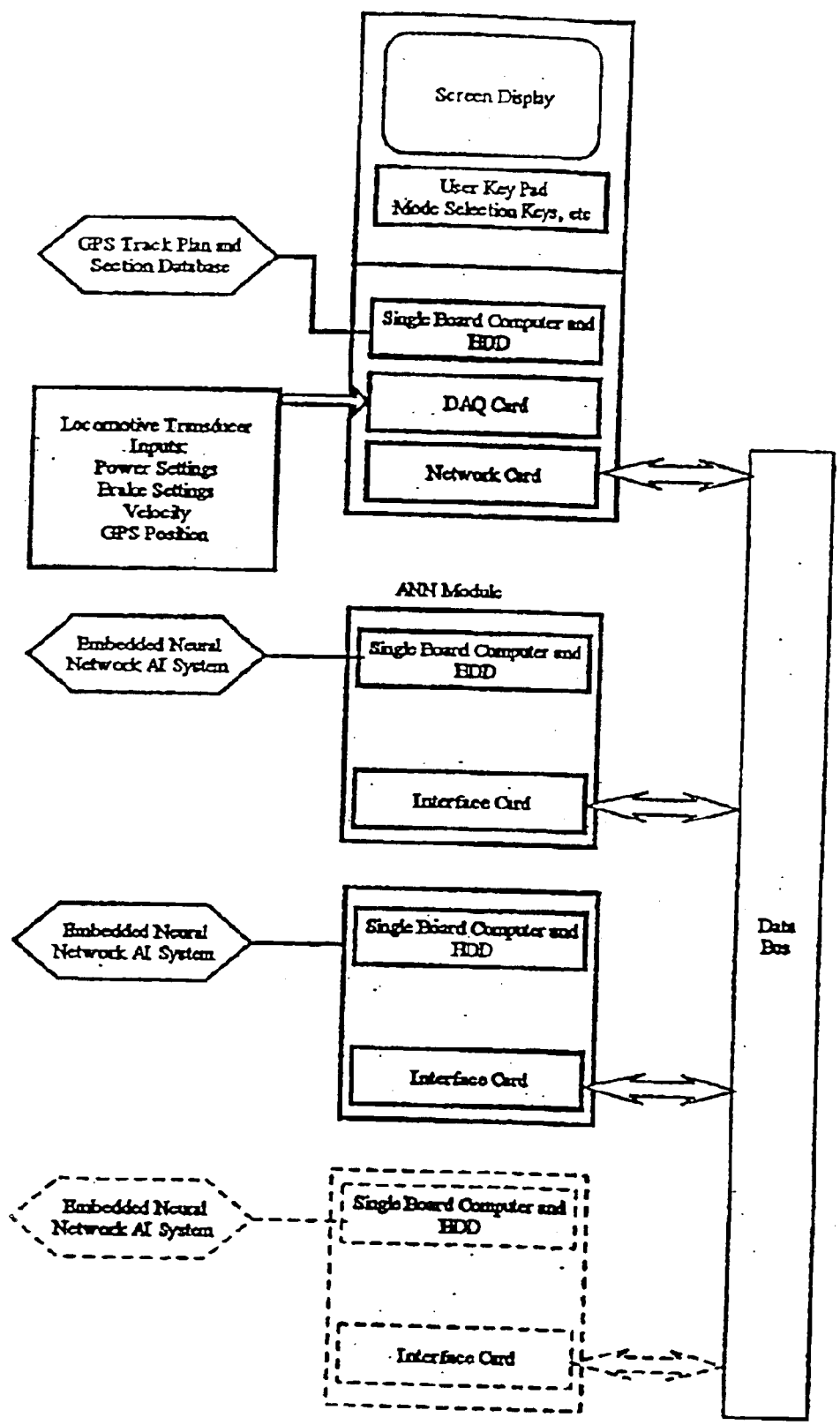
FIG. 6 is a block diagram of a second embodiment of the train dynamics prediction system the invention.

The TDPS may be expanded, as shown in FIG. 6 which illustrates a block diagram of a second embodiment of the present invention. Here several neural network sub-systems may operated in parallel, each ANN module having a dedicated processor and associated interface card for a different future train control setting regime. The processors in the subsidiary ANN modules communicate with a master processor, the user interface and share input data via a common data bus.

Figure 7:
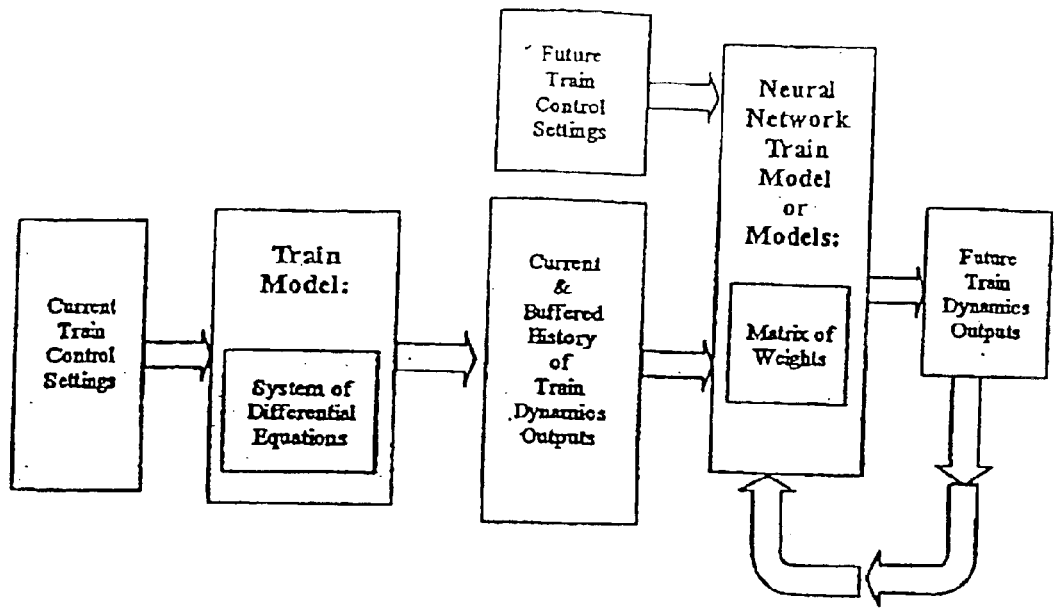
FIG. 7 shows a conceptual diagram of a further artificial neural network (ANN) model contemplated by the invention.

Additional advantages may be obtained if the TDPS described above is conceptualised as shown in FIG. 7. Instead of both the train dynamic model and the future prediction model for the train being provided by the neural network, a conventional simulation can be used to provide the train dynamic model in real time. This allows exploitation of well-developed train simulation programs and driver advice systems, such as the LEADER system described in the article by Hawthorn and Smith (see the bottom of page 1), that provide present train parameter outputs in real time. The LEADER system takes current train control settings and uses a system of differential equations to provide the outputs. The neural network uses this present and historical data obtained from the train model, together with the future train control settings to provide outputs for the future time period. The advantages of this concept are:

simplified and reduced input parameter list for the neural network, since the historical control data is replaced by historical output data from the simulator model; and a single train simulator may provide any selected train force parameter.

The characteristic or genre of the force response is provided by the train simulator. This provides the neural network with a 'knowledge base' to extrapolate into the future time period. The applicants are of the view that this concept may possibility facilitate a single network providing predictions for all force output positions in a given train type.

Details of the parameters for the neural network using this concept for distributed power trains is as follows in Table 3 and for head end powered trains in Table 4.

TABLE 3

Detailed ANN Input/Output Structure - Distributed Power Train

| Item | Parameters | Parameter Type | No. Inputs |
|---|---|---|---|
| | Input Parameters | | |
| 1 | Average of Front & Remote Throttle Level | Control Future | NF/5 |
| 2 | Average of Front & Remote Brake Pip Pressure | Control Futur | NF/5 |
| 3 | Average of Front & Remote Brake Cylinder Pressure | Control Future | NF/5 |
| 4 | Net Change Front Throttle | Control Future | 1 |
| 5 | Net Change Remote Throttle | Control Future | 1 |
| 6 | Net Change Front Brake Pipe Pressure | Control Future | 1 |
| 7 | Net Change Remote Brake Pipe Pressure | Control Future | 1 |
| 8 | Net Change Front Brake Cylinder Pressure | Control Future | 1 |
| 9 | Net Change Remote Brake Cylinder Pressure | Control Future | 1 |
| 10 | Net Change in Track Elevation | Control Future | 1 |
| 11 | Average of Front & Remote Throttle Level | Control Present | 1 |
| 12 | Average of Front & Remote Brake Pipe Pressure | Control Present | 1 |
| 13 | Average of Front & Remote Brake Cylinder Pressure | Control Present | 1 |
| 14 | Instantaneous Change Front Throttle | Control Present | 1 |
| 15 | Instantaneous Change Remote Throttle | Control Present | 1 |
| 16 | Instantaneous Change Front Brake Pipe Pressure | Control Present | 1 |
| 17 | Instantaneous Change Remote Brake Pipe Pressure | Control Present | 1 |

TABLE 3-continued

Detailed ANN Input/Output Structure - Distributed Power Train

| Item | Parameters | Parameter Type | No. Inputs |
|---|---|---|---|
| 18 | Instantaneous Change Front Brake Cylinder Pressure | Control Present | 1 |
| 19 | Instantaneous Change Remote Brake Cylinder Pressure | Control Present | 1 |
| 20 | Average of Front & Remote Velocity | Operational Present | 1 |
| 21 | Train Acceleration | Operational Present | 1 |
| 22 | Coupler Force | Operational Present & History | NPH |
| 23 | First Difference Coupler Force | Operational Present & History | NPH |
| 25 | Hidden Layer Feedback | Neural Net Feedback | HL |
| 26 | Coupler Force | Control Future Feedback | NF |
| 27 | Velocity | Control Future Feedback | NF |
| 28 | BIAS | | 1 |
| | Output Parameters | | |
| 1 | Coupler Force | Operational | NF |
| 2 | Velocity | Operational | NF |

TABLE 4

Detailed ANN Input/Output Structure - Head End Powered Train

| Item | Parameters | Parameter Type | No. Inputs |
|---|---|---|---|
| | Input Parameters | | |
| 1 | Front Throttle Level | Control Future | NF/5 |
| 2 | Front Brake Pipe Pressure | Control Future | NF/5 |
| 3 | Front Brake Cylinder Pressure | Control Future | NF/5 |
| 4 | Net Change Front Throttle | Control Future | 1 |
| 5 | Net Change Front Brake Pipe Pressure | Control Future | 1 |
| 6 | Net Change Front Brake Cylinder Pressure | Control Future | 1 |
| 7 | Net Change in Track Elevation | Control Future | 1 |
| 8 | Front Throttle Level | Control Present | 1 |
| 9 | Front Brake Pipe Pressure | Control Present | 1 |
| 10 | Front Brake Cylinder Pressure | Control Present | 1 |
| 11 | Instantaneous Change Front Throttle | Control Present | 1 |
| 12 | Instantaneous Change Front Brake Pipe Pressure | Control Present | 1 |
| 13 | Instantaneous Change Front Brake Cylinder Pressure | Control Present | 1 |
| 14 | Average of Front & Remote Velocity | Operational Present | 1 |
| 15 | Train Acceleration | Operational Present | 1 |
| 16 | Coupler Force | Operational Present & History | NPH |
| 17 | First Difference Coupler Force | Operational Present & History | NPH |
| 18 | Hidden Layer Feedback | Neural Net Feedback | HL |
| 19 | Coupler Force | Control Future Feedback | NF |
| 20 | Velocity | Control Future Feedback | NF |
| 21 | BIAS | | 1 |
| | Output Parameters | | |
| 1 | Coupler Force | Operational | NF |
| 2 | Velocity | Operational | NF |

The input HL referenced in the above tables is the number of neurons in the hidden layer of the artificial neural network.

Figure 8:
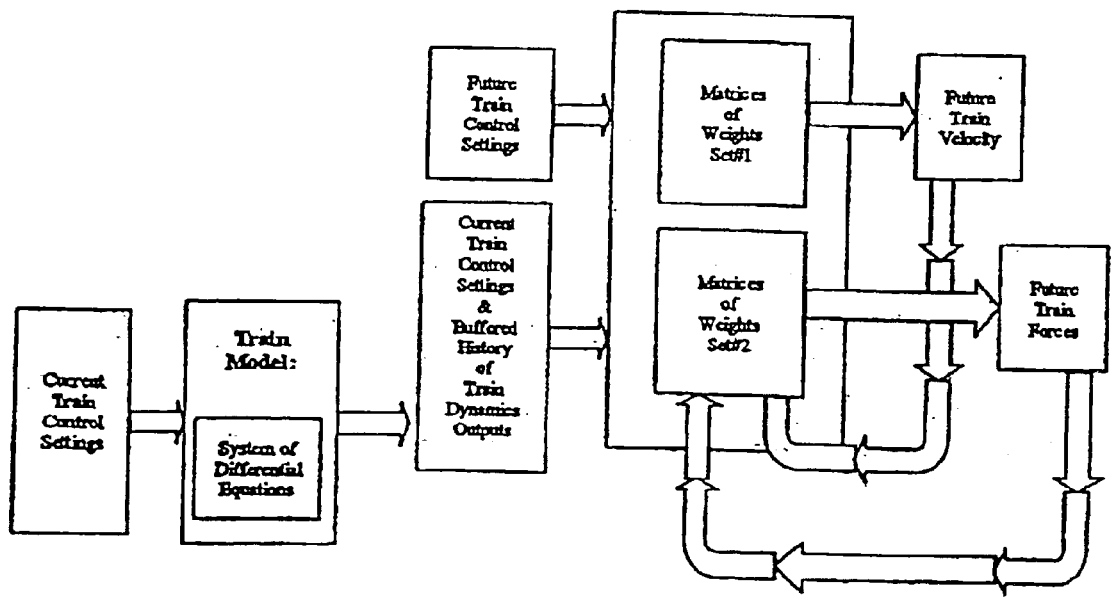
FIG. 8 is a conceptual diagram of a modified version of the ANN model of FIG. 7.

A further improvement of this latter concept of the invention, is a system wherein the velocity and force prediction systems are handled by distinct neural networks, as depicted in FIG. 8. A first set of weights for a relatively simple network deals with velocity prediction (see Table 5), whilst a second set of weights is provided for train coupler force prediction (see Table 6). The input/output structures for the ANN described by Tables 5 and 6 (below) relate to a distributed power train, ie. a train with both a head end set of locomotives, together with a set of locomotives part way along the train consist.

The input/output structures suitable for modelling a head end (only) powered train at set out in Tables 7 and 8, for each of velocity prediction and subsequent force prediction, respectively.

TABLE 5

Detailed ANN Structure (Velocity Prediction) - Distributed Power Train

| Item | Parameters | Parameter Type | No. Inputs |
|---|---|---|---|
| | Input Parameters | | |
| 1 | Average of Front & Remote Throttle Level | Control Future | NF/5 |
| 2 | Average of Front & Remote Brake Pipe Pressure | Control Future | NF/5 |
| 3 | Average of Front & Remote Brake Cylinder Pressure | Control Future | NF/5 |
| 4 | Estimated Net Change in Track Elevation | Control Future | 1 |
| 5 | Average of Front & Remote Throttle Level | Control Present | 1 |
| 6 | Average of Front & Remote Brake Pipe Pressure | Control Present | 1 |
| 7 | Average of Front & Remote Brake Cylinder Pressure | Control Present | 1 |
| 8 | Velocity | Operational Present | 1 |
| 9 | Train Acceleration | Operational Present | 1 |
| 10 | Mean Lead Loco Coupler Force | Operational Present & History | NPH |
| 11 | Mean Remote Loco Coupler Force | Operational Present & History | NPH |
| 12 | BIAS | | 1 |
| | Output Parameters | | |
| 1 | Velocity | Operational | NF |

The velocity output from the first neural network model (represented by the matrices of weights, set #1 in FIG. 8) is utilized by the second neural network model. In particular, parameter items 4, 12 and 13 for Table 6 below, relate to average and net change velocity parameters derived directly from the velocity output, see Table 5 above.

TABLE 6

Detailed ANN Input/Output Structure (Force Prediction) - Distributed Power Train

| Item | Parameters | Parameter Type | No. Inputs |
|---|---|---|---|
| | Input Parameters | | |
| 1 | Average of Front & Remote Throttle Level | Control Future | NF/5 |
| 2 | Average of Front & Remote Brake Pipe Pressure | Control Future | NF/5 |
| 3 | Average of Front & Remote Brake Cylinder Pressure | Control Future | NF/5 |
| 4 | Average of Front & Remote Velocity | Operational Future | NF/5 |
| 5 | Net Change Front Throttle | Control Future | 1 |
| 6 | Net Change Remote Throttle | Control Future | 1 |
| 7 | Net Change Front Brake Pipe Pressure | Control Future | 1 |
| 8 | Net Change Remote Brake Pipe Pressure | Control Future | 1 |
| 9 | Net Change Front Brake Cylinder Pressure | Control Future | 1 |
| 10 | Net Change Remote Brake Cylinder Pressure | Control Future | 1 |
| 11 | Net Change in Track Elevation | Control Future | 1 |
| 12 | Net Change Front Velocity | Operational Future | 1 |
| 13 | Net Change Remote Velocity | Operational Future | 1 |
| 14 | Average of Front & Remote Throttle Level | Control Present | 1 |
| 15 | Average of Front & Remote Brake Pipe Pressure | Control Present | 1 |
| 16 | Average of Front & Remote Brake Cylinder Pressure | Control Present | 1 |
| 17 | Instantaneous Change Front Throttle | Control Present | 1 |
| 18 | Instantaneous Change Remote Throttle | Control Present | 1 |
| 19 | Instantaneous Change Front Brake Pipe Pressure | Control Present | 1 |
| 20 | Instantaneous Change Remote Brake Pipe Pressure | Control Present | 1 |
| 21 | Instantaneous Change Front Brake Cylinder Pressure | Control Present | 1 |
| 22 | Instantaneous Change Remote Brake Cylinder Pressure | Control Present | 1 |
| 23 | Instantaneous Change Front Velocity | Control Present | 1 |
| 24 | Instantaneous Change Remote Velocity | Control Present | 1 |
| 25 | Average of Front & Remote Velocity | Operational Present | 1 |
| 26 | Train Acceleration | Operational Present | 1 |

TABLE 6-continued

Detailed ANN Input/Output Structure (Force Prediction) - Distributed Power Train

| Item | Parameters | Parameter Type | No. Inputs |
|---|---|---|---|
| 27 | Coupler Force | Operational Present & History | NPH |
| 28 | First Difference Coupler Force | Operational Present & History | NPH |
| 29 | Second Difference Coupler Force | Operational Present and History | NPH |
| 30 | Hidden Layer Feedback | Neural Net Feedback | HL |
| 31 | Coupler Force | Control Future Feedback | NF |
| 33 | BIAS | | 1 |
| | Output Parameters | | |
| | Coupler Force | Operational | NF |

The detailed input/output structures for the ANNs for predicting force and velocity in relation to a head end powered train are set out below in Tables 7 and 8, respectively.

TABLE 7

Detailed ANN Input/Output Structure (Force Prediction) - Head End Powered Train

| Item | Inputs Parameters | Parameter Type | No. Inputs |
|---|---|---|---|
| | Input Parameters | | |
| 1 | Front Throttle Level | Control Future | NF/5 |
| 2 | Front Brake Pipe Pressure | Control Future | NF/5 |
| 3 | Front Brake Cylinder Pressure | Control Future | NF/5 |
| 4 | Net Change in Track Elevation | Control Future | 1 |
| 5 | Front Throttle Level | Control Present | 1 |

TABLE 7-continued

Detailed ANN Input/Output Structure (Force Prediction) - Head End Powered Train

| Item | Inputs Parameters | Parameter Type | No. Inputs |
|---|---|---|---|
| 6 | Front Brake Pipe Pressure | Control Present | 1 |
| 7 | Front Brake Cylinder Pressure | Control Present | 1 |
| 8 | Velocity | Operational Present | 1 |
| 9 | Train Acceleration | Operational Present | 1 |
| 10 | Mean Lead Loco Coupler Force | Operational Present & History | NPH |
| 11 | BIAS | | 1 |
| | Output Parameters | | |
| | Velocity | Operational | NF |

TABLE 8

Detailed ANN Input/Output Structure (Velocity Prediction) - Head End Powered Train

| Item | Inputs Parameters | Parameter Type | No. Inputs |
|---|---|---|---|
| | Input Parameters | | |
| 1 | Front Throttle Level | Control Future | NF/5 |
| 2 | Front Brake Pipe Pressure | Control Future | NF/5 |
| 3 | Front Brake Cylinder Pressure | Control Future | NF/5 |
| 4 | Front Velocity | Operational Future | NF/5 |
| 5 | Net Change Front Throttle | Control Future | 1 |
| 6 | Net Change Front Brake Pipe Pressure | Control Future | 1 |
| 7 | Net Change Front Brake Cylinder Pressure | Control Future | 1 |
| 8 | Net Change in Track Elevation | Control Future | 1 |
| 9 | Net Change Front Velocity | Operational Future | 1 |
| 10 | Front Throttle Level | Control Present | 1 |
| 11 | Front Brake Pipe Pressure | Control Present | 1 |
| 12 | Front Brake Cylinder Pressure | Control Present | 1 |
| 13 | Instantaneous Change Front Throttle | Control Present | 1 |
| 14 | Instantaneous Change Front Brake Pipe Pressure | Control Present | 1 |
| 15 | Instantaneous Change Front Brake Cylinder Pressure | Control Present | 1 |
| 16 | Instantaneous Change Front Velocity | Control Present | 1 |
| 17 | Front Velocity | Operational Present | 1 |
| 18 | Train Acceleration | Operational Present | 1 |
| 19 | Coupler Force | Operational Present & History | NPH |
| 20 | First Difference Coupler Force | Operational Present & History | NPH |

TABLE 8-continued

Detailed ANN Input/Output Structure (Velocity Prediction) - Head End Powered Train

| Item | Inputs Parameters | Parameter Type | No. Inputs |
|---|---|---|---|
| 21 | Second Difference Coupler Force | Operational Present & History | NPH |
| 22 | Hidden Layer Feedback | Neural Net Feedback | HL |
| 23 | Coupler Force | Control Future Feedback | NF |
| 24 | BIAS | | 1 |
| | Output Parameters | | |
| 1 | Coupler Force | Operational | NF |

Parameter items 4 and 9 may be derived from the velocity predicted by the output from the first ANN model represented by Table 7, above.

Throughout this specification, unless the context requires otherwise, the word "comprise", and variations such as "comprises" or "comprising", will be understood to imply the inclusion of a stated integer or group of integers but not the exclusion of any other integer or group of integers.

Throughout the specification the aim has been to describe the preferred embodiments of the invention without limiting the invention to any one embodiment or specific collection of features. Modifications and improvements to the invention will be apparent to persons skilled in the relevant fields of technology.

What is claimed is:

1. A vehicle dynamics prediction system for providing predictions, over a predetermined future time period, of vehicle velocity, which predictions utilize future vehicle control settings anticipated for that period, said prediction system including:

(a) a processing means coupled to a user interface for facilitating selection of future vehicle control settings and selection of a route for travel of the vehicle;

(b) a first input arrangement for inputting data about current vehicle position to the processing means;

(c) a second input arrangement for inputting data about current vehicle control settings and data about current vehicle operational parameters to the processing means;

(d) a first memory arrangement coupled to the first input arrangement for storing historical vehicle position data and for buffering current vehicle position data prior to storage;

(e) a second memory arrangement coupled to the second input arrangement for storing historical control setting data and historical operational parameter data and for buffering current control setting data and current operational parameter data prior to storage;

(f) an artificial intelligence database coupled to the processing means, containing a plurality of weighting values for neural network models representing dynamic performance of respective units comprising the vehicle;

(g) a route topographical database coupled to the processing means, containing position data about available routes of travel for the vehicle;

wherein the processing means calculates future conditions of the vehicle based on the current vehicle position data relative to the selected route utilizing position data obtained from the route topographical database, and predicts the vehicle velocity in the vehicle during said predetermined period by processing the vehicle control setting data and operational parameter data through the neural network models, which models employ the weighting values from the artificial intelligence database, for calculated future vehicle positions and associated future control settings.

2. The vehicle dynamics prediction system of claim 1 wherein the system also provides predictions of longitudinal forces present in the vehicle, wherein the processing means uses the vehicle velocity predictions combined with future control data to further predict longitudinal forces for at least one selected location in the length of the vehicle during said predetermined period.

3. The vehicle dynamics predication system of claim 1 wherein the vehicle control settings include throttle and brake settings.

4. The vehicle dynamics prediction system of claim 1 wherein the vehicle operational parameters include the vehicle velocity and a force between at least two inter-coupled units of the vehicle.

5. The vehicle dynamic prediction system of claim 4 wherein the vehicle operational parameters further include a force between a motive power unit and a plurality of trailed units.

6. The vehicle dynamics prediction system of claim 1 used on vehicles in the form of a train consisting of at least a locomotive unit and a plurality of wagon units and/or carriage units.

7. The vehicle dynamics prediction system of claim 1 used on vehicles in the form of a multiple trailer road vehicle comprising a prime mover or tractor and at least three trailer units.

8. A method of predicting, over a predetermined future time period, vehicle velocity which predictions utilize future vehicle control settings anticipated for that period, said prediction method including the steps of:

(a) selecting future control settings and a desired route for travel of the vehicle;

(b) inputting data about current vehicle position to a processing means;

(c) inputting data about current vehicle control settings and data about current vehicle operational parameters to the processing means;

(d) storing in a first memory arrangement historical vehicle position data and buffering current vehicle position data prior to storage;

(e) storing in a second memory arrangement historical control setting data and historical operational parameter data and buffering current control setting data and current operational parameter data prior to storage;

(f) providing an artificial intelligence database coupled to the processing means, containing a plurality of weighting values for neural network models representing dynamic performance of respective units comprising the vehicle;

(g) providing a route topographical database coupled to the processing means, containing position data about available routes of travel for the vehicle;

(h) calculating future conditions of the vehicle based on the current vehicle position data relative to the desired route and position data obtained from the route topographical database;

(i) processing the vehicle control setting data and operational parameter data through at least one neural network model, which models employ the weighting values from the artificial intelligence database, for calculated future positions and associated future control settings to provide predictions of the vehicle velocity during said predetermined period.

9. The method of claim 8 that includes the step of providing predictions of longitudinal forces present in the vehicle, wherein the processing means uses the vehicle velocity predictions combined with future control data to further predict longitudinal forces for at least one selected location in the length of the vehicle during said predetermined period.

10. The method of claim 9 that includes the step of providing predictions of the forces between a motive power unit, and trailed units in order to predict both force input into the trailed units by the motive power unit and force input into the motive power unit by the trailed units.

11. The method of claim 10 that includes the step of providing a prediction of energy transfer occurring in the vehicle during the predetermined period from the following formula, using predictions of forces between the motive power unit and trailed units and predictions of vehicle velocity:

$$Energy = \sum_{i=0}^{i=n} F_i \cdot v_i \delta t$$

where: F=instantaneous force prediction;
v=instantaneous vehicle velocity prediction;
i=time sample instance; and
n=number of samples in said predetermined period.

12. The method of claim 9 wherein the predictions of longitudinal forces are provided by a separate neural network model.

13. The method of claim 9 wherein the predictions of longitudinal forces are provided by a single integrated neural network model.

* * * * *

UNITED STATES PATENT AND TRADEMARK OFFICE
CERTIFICATE OF CORRECTION

PATENT NO. : 6,853,889 B2
DATED : February 8, 2005
INVENTOR(S) : Cole

It is certified that error appears in the above-identified patent and that said Letters Patent is hereby corrected as shown below:

Title page,
Item [54], Title, should read -- VEHICLE DYNAMICS PREDICTION SYSTEM AND METHOD --.

Signed and Sealed this

Third Day of May, 2005

JON W. DUDAS
*Director of the United States Patent and Trademark Office*